US007687778B2

(12) United States Patent
Wang et al.

(10) Patent No.: US 7,687,778 B2
(45) Date of Patent: Mar. 30, 2010

(54) INFRARED RECEIVER AND ELECTRONIC DEVICE

(75) Inventors: He-Li Wang, Shenzhen (CN); Hong Li, Shenzhen (CN); Ting Zhang, Shenzhen (CN); Ting-Ting Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/133,387

(22) Filed: Jun. 5, 2008

(65) Prior Publication Data

US 2009/0146064 A1 Jun. 11, 2009

(30) Foreign Application Priority Data

Dec. 7, 2007 (CN) ........................ 2007 1 0202921

(51) Int. Cl.
*G01J 5/08* (2006.01)

(52) U.S. Cl. ...................................................... 250/353

(58) Field of Classification Search .................. 250/353
See application file for complete search history.

(56) References Cited

U.S. PATENT DOCUMENTS

| | | | | |
|---|---|---|---|---|
| 5,036,188 | A * | 7/1991 | Keitoku | 250/216 |
| 6,724,442 | B1 | 4/2004 | Zyskowski et al. | |
| 2002/0160709 | A1* | 10/2002 | Kuo | 455/3.06 |
| 2002/0160714 | A1* | 10/2002 | Kuo | 455/42 |

* cited by examiner

*Primary Examiner*—David P Porta
*Assistant Examiner*—Marcus H Taningco
(74) *Attorney, Agent, or Firm*—Frank R. Niranjan

(57) ABSTRACT

An infrared receiver includes a shielding member and an infrared detecting member. The shielding member has negative refractive power for diverging incident infrared rays. The infrared detecting member includes a main body formed with a convex surface having positive refractive power and an infrared sensor enclosed in the main body. The infrared sensor receives infrared rays converged by the convex surface, and converts received infrared rays to electrical signals.

19 Claims, 7 Drawing Sheets

INFRARED RECEIVER AND ELECTRONIC DEVICE

BACKGROUND

1. Field of the Invention

The present invention generally relates to infrared receivers, and particularly to an infrared receiver arranged in an electronic device.

2. Description of Related Art

Infrared receivers are widely used in electronic devices, such as televisions and digital versatile disc (DVD) players. An infrared receiver is utilized for detecting infrared rays, and providing electrical signals converted from the detected infrared rays to achieve some functions of a corresponding electronic device.

Referring to FIG. 6, a conventional infrared receiver 90 includes an infrared detecting member 91 and a shielding member 93. The infrared detecting member 91 includes a convex surface 912 and an infrared sensor 911. The infrared sensor 911 is generally located at a focus of the convex surface 912, for receiving infrared rays converged by the convex surface 912. The infrared sensor 911 receives the infrared rays and coverts them to electrical signals for further processing.

The shielding member 93 is disposed between an infrared transmitter (not shown) and the infrared detecting member 91. Typically, the shielding member 93 is a planar plate and is adjacent to the convex surface 912. Therefore, parallel infrared rays 922 perpendicularly pass through the shielding member 93 without changing their propagation direction. Consequently, the infrared rays are properly converged to the infrared sensor 911 for detecting.

Referring to FIG. 7, when parallel infrared rays 924 are obliquely projected to the shielding member 93, the infrared rays are converged by the convex surface 912 to a point that deviates from the focus. As a result, some infrared rays are not able to arrive at the infrared sensor 911. Hence, the currently used infrared receiver has limited reception capability of infrared rays and the infrared rays may not be correctly converted to electrical signals.

Therefore, an infrared receiver with improved reception capability of infrared rays is desired. Moreover, an electronic device has an infrared receiver arranged therein is also desired.

SUMMARY

Accordingly, an infrared receiver is provided. The infrared receiver includes a shielding member and an infrared detecting member. The shielding member has negative refractive power for diverging incident infrared rays. The infrared detecting member includes a main body formed with a convex surface having positive refractive power and an infrared sensor enclosed in the main body. The infrared sensor receives infrared rays converged by the convex surface, and converts received infrared rays to electrical signals.

Other advantages and novel features will become more apparent from the following detailed description of exemplary embodiment when taken in conjunction with the accompanying drawings.

DETAILED DESCRIPTION

Figure 1:
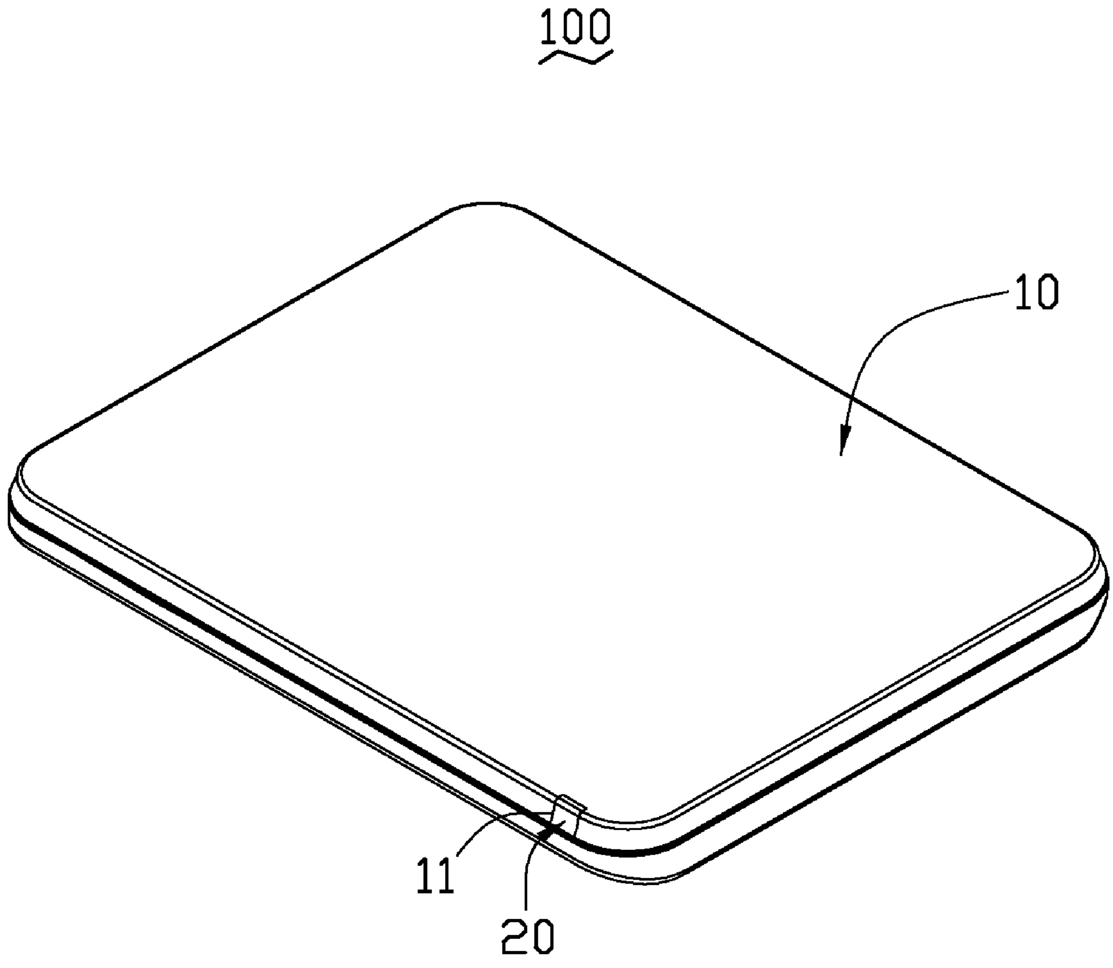
FIG. 1 is an isometric view of an electronic device with an infrared receiver in accordance with an exemplary embodiment.

Referring to FIG. 1, an electronic device 100 in accordance with an exemplary embodiment is illustrated. The electronic device 100 may be a portable digital versatile disc (DVD) player or a notebook computer. The electronic device 100 generally includes an enclosure 10 and an infrared receiver 20. The enclosure 10 is shaped to accommodate various components such as the infrared receiver 20, and an optical pickup unit (OPU) (not shown), etc.

The infrared receiver 20 is generally received in the enclosure 10. The infrared receiver 20 is partially exposed from an opening 11 defined in a side surface of the enclosure 10. With such an arrangement, the infrared receiver 20 is capable of receiving infrared rays, and converting the infrared rays received to electrical signals.

Figure 2:
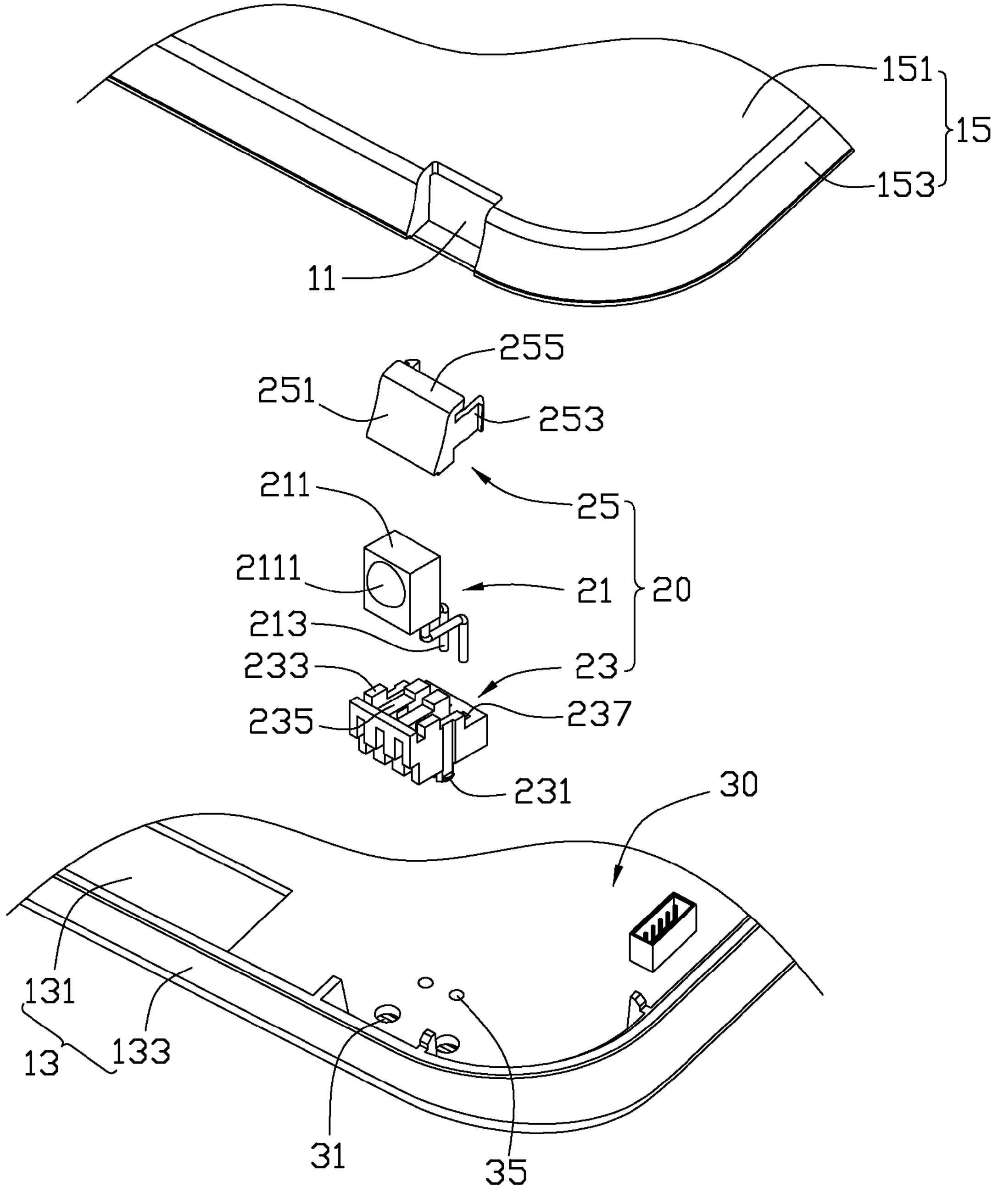
FIG. 2 is an exploded view of the infrared receiver and a part of the electronic device shown in FIG. 1.

Referring to FIG. 2, the enclosure 10 includes a base 13 and a cover 15. The base 13 and the cover 15 may be fastened together by screws, or mechanically coupled to each other by hooks or latches.

The base 13 includes a bottom plate 131 and a bottom wall 133. The bottom wall 133 is substantially perpendicular and extends from the bottom plate 131. A printed circuit board (PCB) 30 is mounted on the bottom plate 131, and surrounded by the bottom wall 133. The PCB 30 is used for supporting the infrared receiver 20. A pair of positioning holes 31 and a pair of insertion holes 35 are defined in the PCB 30 for positioning and electrically coupling the infrared receiver 20 respectively.

The cover 15 includes an upper plate 151 and an upper wall 153. The upper wall 153 substantially extends from the upper plate 151. The opening 11 is defined in a front side of the upper wall 153. The cover 15 cooperates with the base 13 to accommodate the infrared receiver 20.

The infrared receiver 20 includes an infrared detecting member 21, a mounting member 23, and a shielding member 25, each of which will be described with specific structures hereinafter.

The infrared detecting member 21 includes a main body 211 and a plurality of conductive pins 213. A convex surface 2111 having a positive refractive power is formed on one side of the main body 211 for converging the infrared rays into the main body 211. An infrared sensor 2113 (see FIG. 5) is disposed in an interior space of the main body 211 for receiving the converged infrared rays. The infrared sensor 2113 is generally located at a focus of the convex surface 211 for efficiently converting the received infrared rays to electrical signals. The conductive pins 213 are electrically connected to the infrared sensor 2113 for conducting the electrical signals. The conductive pins 213 are inserted into the insertion holes 35 defined in the PCB 30 for transmitting the electrical signals to the PCB 30 for further processing.

The mounting member 23 is provided with a pair of extension legs 231 and a number of protruding portions 233. The extension legs 231 extend laterally downwards from opposite sides of the mounting member 23, and are configured with hook portions 2311 at their distal ends. Each extension leg 231 is able to pass through a corresponding positioning hole 31 from a top surface to a bottom surface of the PCB 30. Each hook portion 2311 is able to fasten a part of the backside of the PCB 30 adjacent to a corresponding positioning hole 31, so as to tightly fasten the mounting member 23 to the PCB 30. The protruding portions 233 protrude upwards to cooperatively define a retaining recess 235 for receiving the main body 211 of the infrared detecting member 21.

A plurality of through holes 237 are defined vertically in the mounting member 23 corresponding to the plurality of conductive pins 213. The through holes 237 are configured for the conductive pins 213 to pass through, and to be inserted in the corresponding insertion holes 35.

The shielding member 25 is formed with a main-receiving portion 251, a sub-receiving portion 255, and a pair of extension arms 253. The sub-receiving portion 255 extends from one end of the main-receiving portion 251, and is substantially perpendicular to the main-receiving portion 251. The main-receiving portion 251 and the sub-receiving portion 255 are made of materials such as acrylic, and polycarbonate that are transmissive of infrared rays. In particular, the main-receiving portion 251 and the sub-receiving portion 255 have negative refractive power for diverging the infrared rays.

The main-receiving portion 251 is formed with a front surface 2511 and a back surface 2513. The front surface 2511 is configured to be concave, and the back surface 2513 is configured to be planar, such that the main-receiving portion 251 has different widths at different locations. For example, an edge portion 2515 (see FIG. 3) located relatively close to the sub-receiving portion 255 is illustrated to have smaller width than an edge portion 2517 (see FIG. 3) located relatively far from the sub-receiving portion 255.

The pair of extension arms 253 extends from the back surface 2513 of the main-receiving portion 251, and are configured with hook portions 2533 at their distal ends respectively. Each extension arm 253 is able to pass through the opening 11. Each hook portion 2533 is able to engage with edges of the upper wall 153 adjacent to the opening 11.

Figure 3:
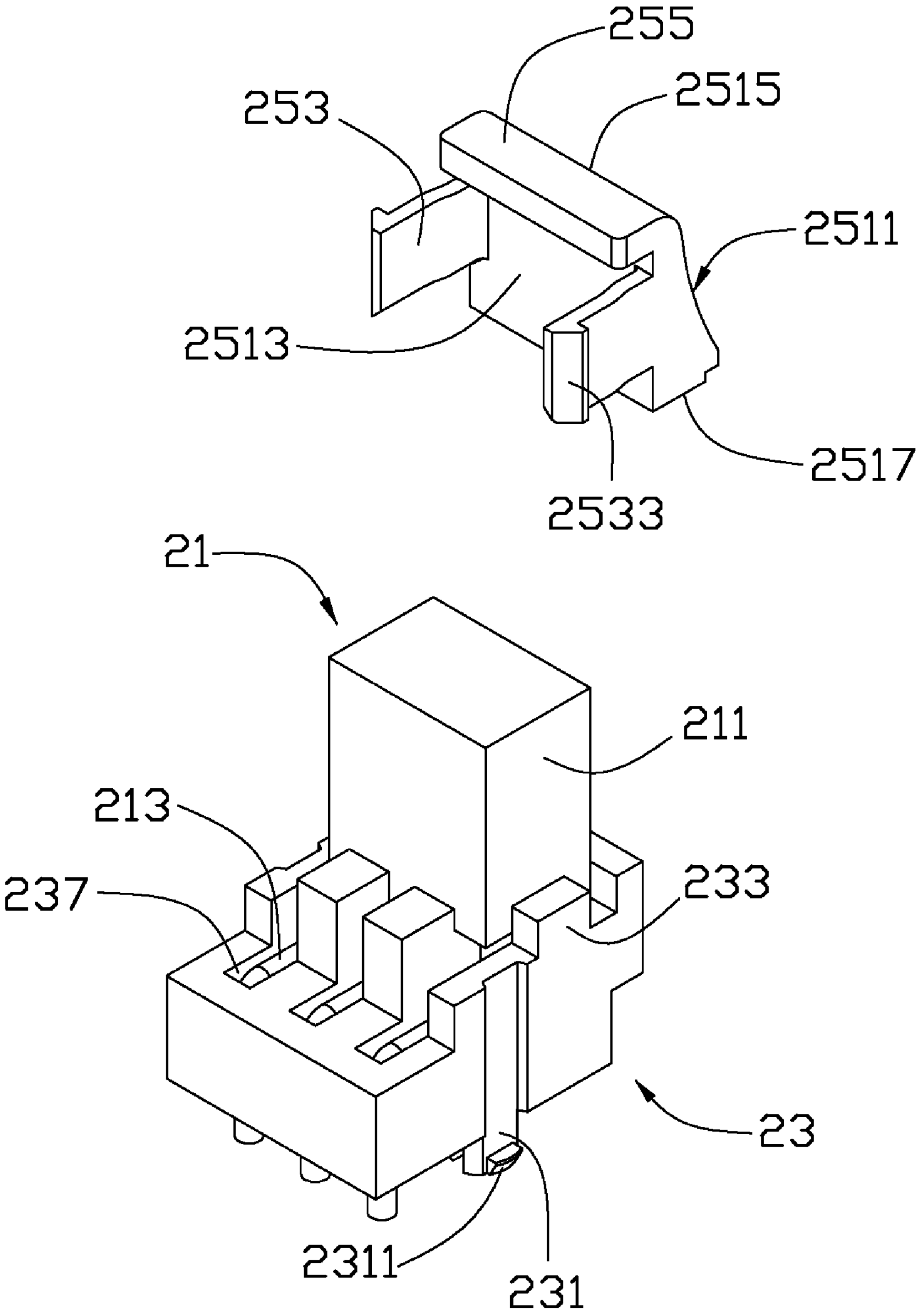
FIG. 3 is a partially assembled view of the infrared receiver shown in FIG. 1.
Figure 4:
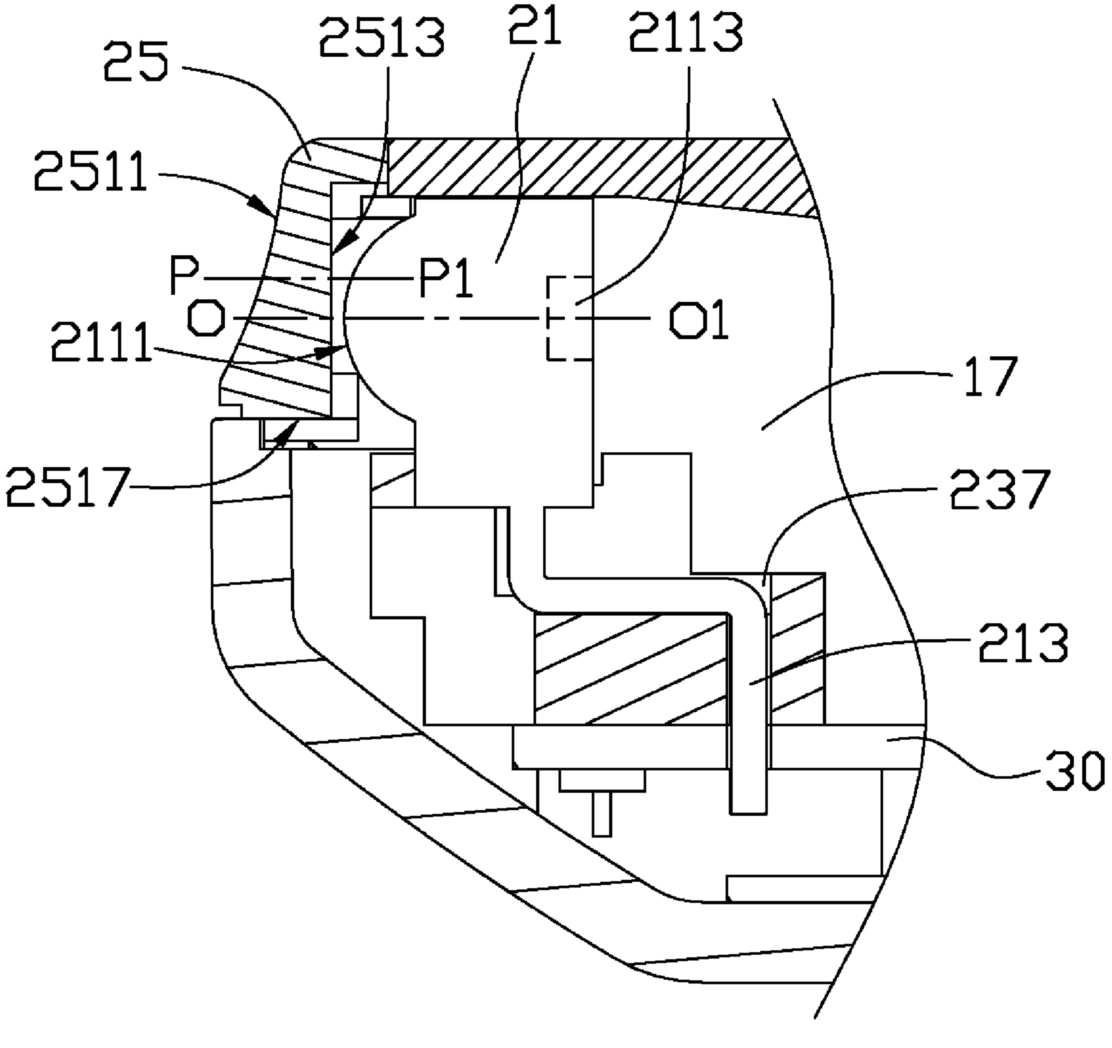
FIG. 4 is a partial sectional view of the electronic device shown in FIG. 1.
Figure 5:
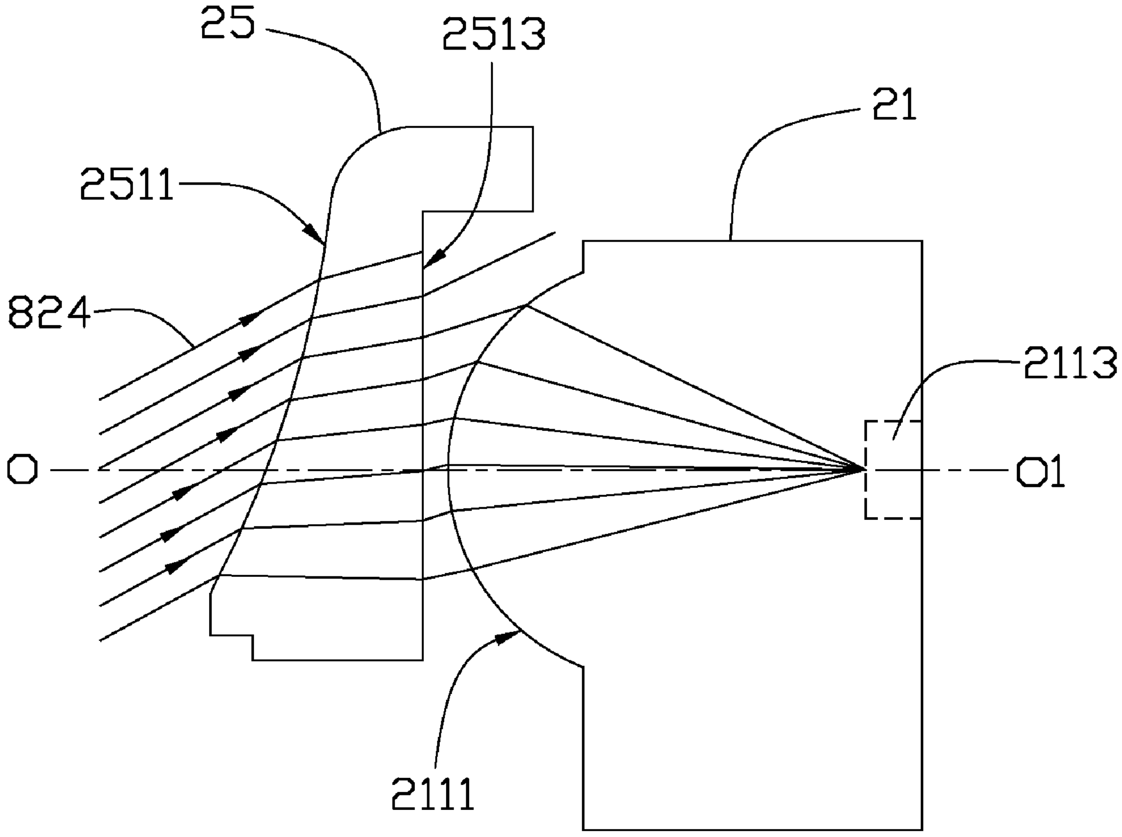
FIG. 5 is an optical schematic diagram of the infrared receiver shown in FIG. 1.
Figure 6:
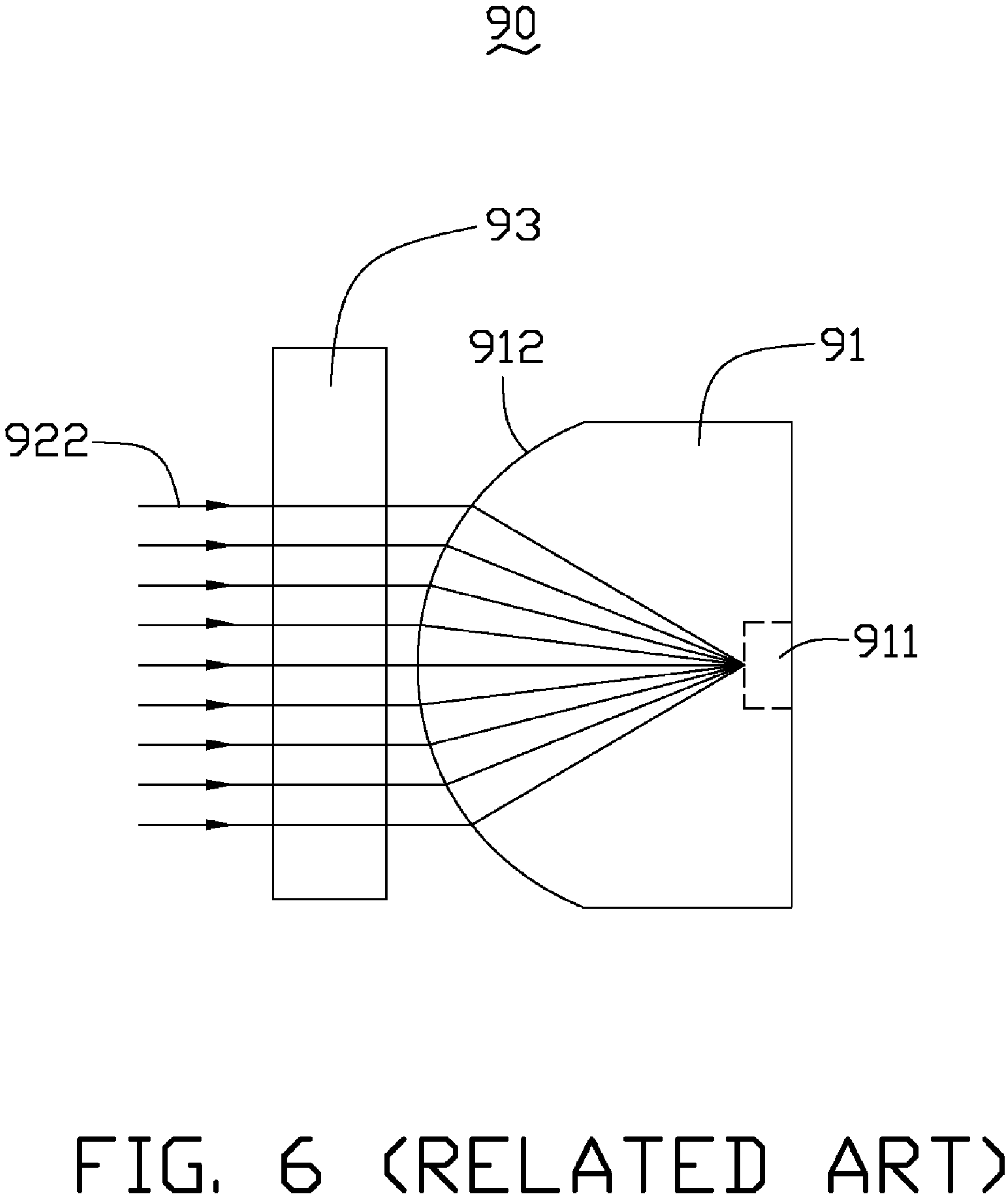
FIG. 6 (RELATED ART)
FIG. 6 is a sectional view of a conventional infrared receiver with infrared rays projecting perpendicularly.
Figure 7:
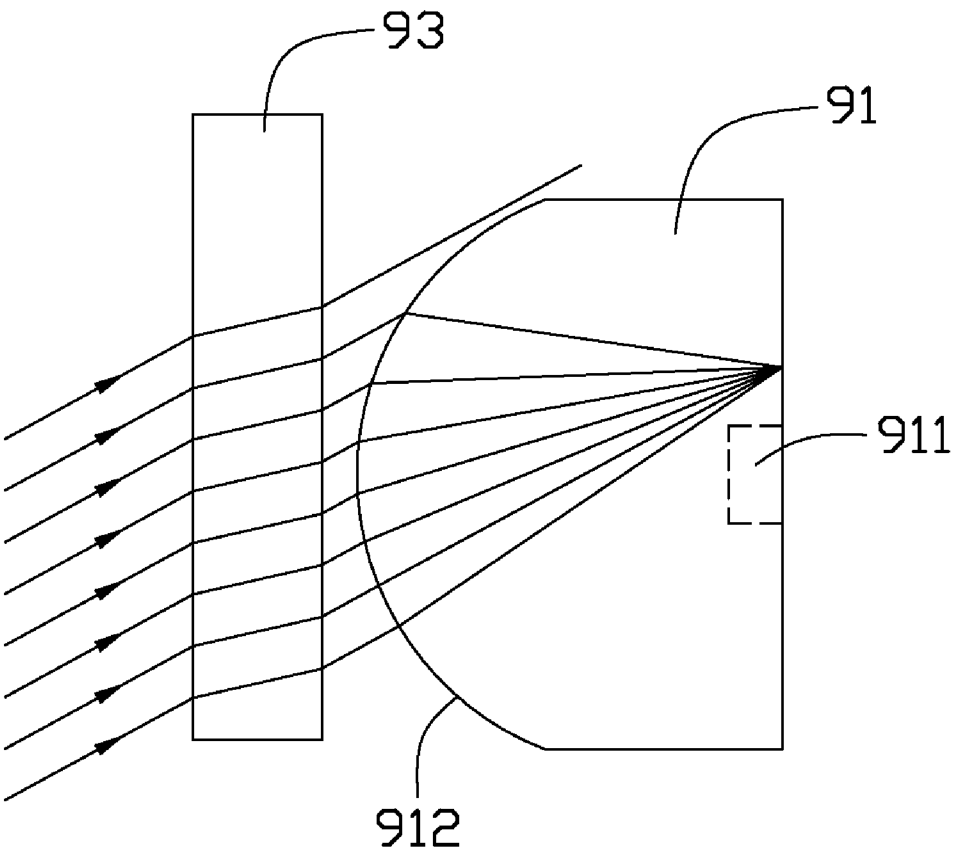
FIG. 7 (RELATED ART)
FIG. 7 is a sectional view of a conventional infrared receiver with infrared rays projecting obliquely.

Referring to FIGS. 3-5, a process of assembling the infrared receiver 20 to the electronic device 100 will be described.

Firstly, the main body 211 is received in the retaining recess 235. The infrared detecting member 21 is seated on the mounting member 23 accordingly. Each conductive pin 213 passes through a corresponding through hole 237 and is inserted into a corresponding insertion hole 35. The conductive pins 213 may be soldered to the PCB 30, such that the infrared detecting member 21 is electrically connected to the PCB 30. Each extension leg 231 passes through a corresponding positioning hole 31, and each hook portion 2311 fastens a part of the backside of the PCB 30 adjacent to a corresponding positioning hole 31. As such, the mounting member 23 is fixedly mounted to the PCB 30.

Secondly, each extension arm 253 passes through the opening 11, and each hook portion 2533 of the extension arm 253 engages with some of the edges of the upper wall 153 adjacent to the opening 11. As such, the shielding member 25 is mounted to the cover 15 of the electronic device 100.

Thirdly, the base 13 and the cover 15 are coupled together, such that the convex surface 2111 of the infrared detecting member 21 faces the back surface 2513 of the shielding member 25.

In use, an infrared transmitter (not shown) may be actuated to emit infrared rays to the infrared receiver 20. Referring to FIG. 5, because the front surface 2511 is concave, infrared rays 824 are diverged by the front surface 2511. As such, when incident infrared rays are obliquely projected to the shielding member 25 at relative large angle with respect to an optical axis OO1 (indicated by the dash line), the propagation direction of the infrared rays is changed. Then the diverged infrared rays are projected to the convex surface 2111. It is understood that the concave surface diverges the infrared rays and the convex surface converges the diverged infrared rays, which does prevent deflection of the infrared rays from the infrared sensor. Consequently, the infrared rays are correctly converted to electrical signals for further processing.

As described above, the shielding member 25 has a concave surface for change propagation direction of the infrared rays, such that obliquely projected infrared rays can be properly converged to the infrared sensor. Therefore, the reception capability of the infrared receiver is improved accordingly.

It will be understood that spatially relative terms, such as "upwards", "downwards" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "downwards" other elements or features would then be oriented "upwards" the other elements or features. Thus, the example term "downwards" can encompass both an orientation of upwards and downwards. The device may be otherwise oriented (rotated 90 degrees or at other orientations) and the spatially relative descriptors used herein interpreted accordingly.

Alternative embodiments will become apparent to those skilled in the art to which the present invention pertains without departing from its spirit and scope.

What is claimed is:

1. An infrared receiver for receiving infrared rays and converting the infrared rays to electrical signals, the infrared receiver comprising:

- a shielding member having a concave surface and a planar surface opposite to the concave surface, the concave surface and the planar surface being connected by a first end and a second end, a thickness being defined between the concave surface and the planar surface, the thickness increasing continuously from the first end to the second end for diverging the infrared rays; and
- an infrared detecting member disposed beside the shielding member, the infrared detecting member comprising:
  - a convex surface arranged after the concave surface for receiving and converging the diverged infrared rays; and
  - an infrared sensor located generally at a focus of the convex surface, the infrared sensor receiving infrared rays converged by the convex surface and converting received infrared rays to the electrical signals.

2. The infrared receiver of claim 1, wherein a pair of extension arms extends from two sides of the planar surface, and the pair of extension arms forms hook portions at their distal ends.

3. The infrared receiver of claim 1, wherein the shielding member forms a sub-receiving portion, the sub-receiving portion extends substantially perpendicularly to the planar surface, and the sub-receiving portion is transmissive of infrared rays.

4. The infrared receiver of claim 1, wherein the concave surface is positioned in a manner to receive the infrared rays incident thereto.

5. An infrared receiver, comprising:

a shielding member having negative refractive power, the shielding member having a, concave surface and a planar surface opposite to the concave surface, the concave surface and the planar surface being connected by a first end and a second end, a thickness being defined between the concave surface and the planar surface, the thickness increasing continuously from the first end to the second end for diverging infrared rays; and an infrared detecting member comprising:

a main body formed with a convex surface having positive refractive power for receiving and converging the diverged infrared rays; and an infrared sensor enclosed in the main body, the infrared sensor receiving infrared rays converged by the convex surface, and converting received infrared rays to electrical signals.

6. The infrared receiver of claim 5, wherein the infrared sensor is located substantially at a focus of the convex surface.

7. The infrared receiver of claim 5, wherein the infrared detecting member further comprises a plurality of conductive pins electrically connected to the infrared sensor and extending outwards from the main body.

8. The infrared receiver of claim 5, wherein the infrared receiver further comprises a mounting member defining a retaining recess therein for seating the main body.

9. The infrared receiver of claim 8, wherein the infrared detecting member further comprises a plurality of conductive pins electrically connected to the infrared sensor and extending outwards from the main body, the mounting member defines a plurality of through holes therein for the plurality of conductive pins to pass therethrough.

10. The infrared receiver of claim 8, wherein the mounting member is provided with a pair of extension legs extending from two lateral sides of the mounting member and forming hook portions at their distal ends.

11. An electronic device, comprising:

an enclosure defining an opening in a side surface thereof;

a shielding member received in the opening, the shielding member having a concave surface and a planar surface opposite to the concave surface, the concave surface and the planar surface being connected by a first end and a second end, a thickness being defined between the concave surface and the planar surface, the thickness increasing continuously from the first end to the second end for diverging infrared rays; and an infrared detecting member accommodated in the enclosure, the infrared detecting member disposed beside the shielding member, comprising:

a main body formed with a convex surface for receiving and converging the diverged infrared rays; and an infrared sensor enclosed in the main body, the infrared sensor receiving infrared rays converged by the convex surface, and converting received infrared rays to electrical signals.

12. The electronic device of claim 11, wherein the enclosure comprises a base and a cover, and the opening is defined in the cover.

13. The electronic device of claim 12, wherein the shielding member is provided with a pair of extension arms, and each extension arm has a hook portion for engaging with part of the cover adjacent to the opening.

14. The electronic device of claim 11, wherein the infrared sensor is located substantially at a focus of the convex surface.

15. The electronic device of claim 11, wherein the infrared detecting member further comprises a plurality of conductive pins electrically connected to the infrared sensor and extending outwards from the main body.

16. The electronic device of claim 11, further comprising a mounting member defining a retaining recess therein for seating the main body.

17. The electronic device of claim 16, wherein the infrared detecting member further comprises a plurality of conductive pins electrically connected to the infrared sensor and extending outwards from the main body, the mounting member defines a plurality of through holes therein for the plurality of conductive pins to pass therethrough.

18. The electronic device of claim 16, wherein the mounting member is provided with a pair of extension legs extending from two lateral sides of the mounting member and forming hook portions at their distal ends.

19. The electronic device of claim 18, further comprising a printed circuit board mounted on the base and defining a pair of positioning holes for the extension legs to pass therethrough, and the hook portions of the extension legs engage with the positioning holes for fixing the mounting member to the printed circuit board.

* * * * *